Feb. 28, 1956 J. H. NELSON 2,736,348
BAND SAW BLADE TRAP
Filed April 23, 1954
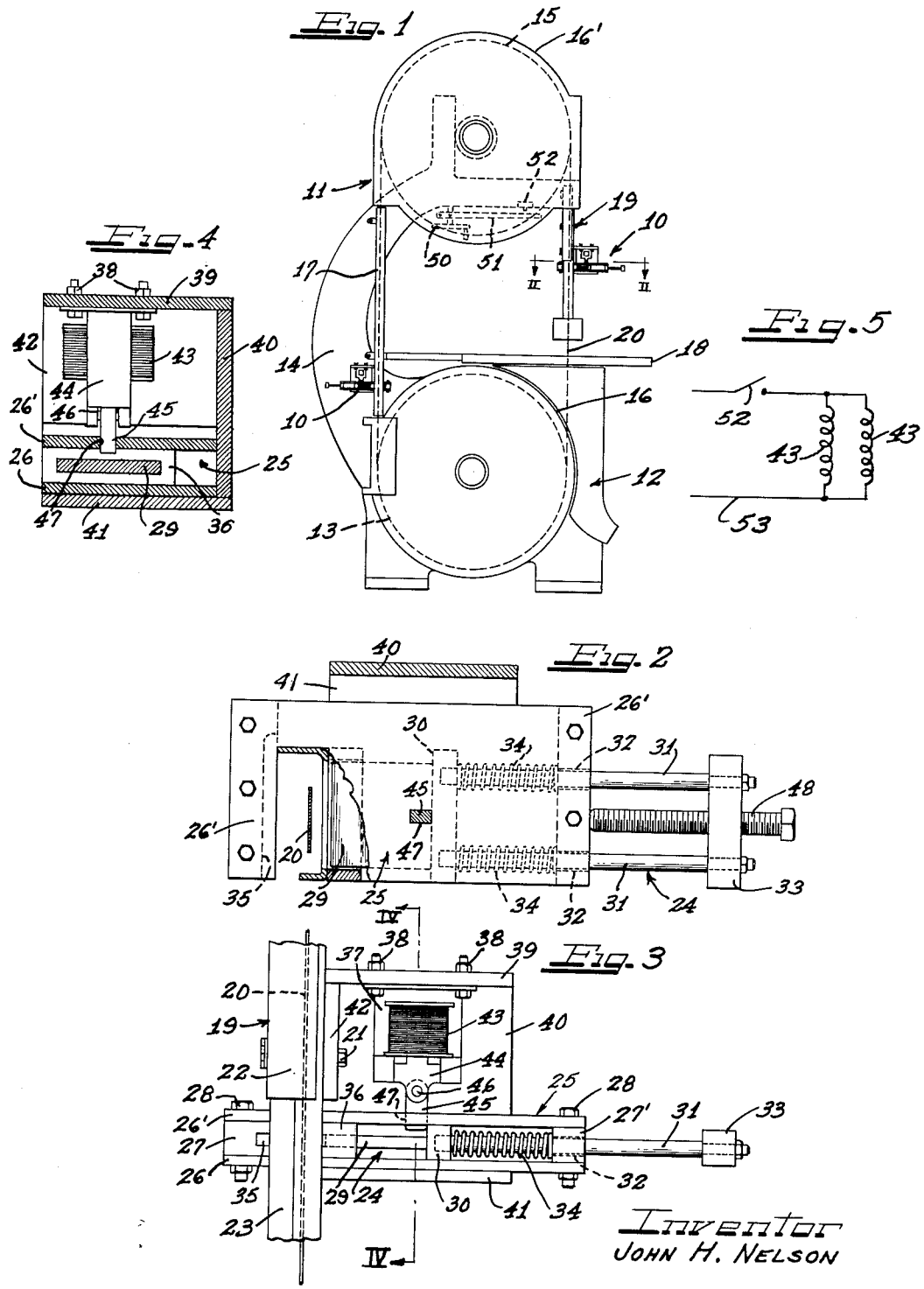
Inventor
JOHN H. NELSON

United States Patent Office 2,736,348
Patented Feb. 28, 1956

2,736,348

BAND SAW BLADE TRAP

John H. Nelson, Palos Park, Ill., assignor to Kropp Forge Company, Chicago, Ill., a corporation of Illinois Application April 23, 1954, Serial No. 425,203

6 Claims. (Cl. 143—17)

This invention relates to a safety device to be used in connection with a power driven belt, where, upon breaking of the belt, the safety device arrests further movement of the belt.

An object of this invention is to provide a safety mechanism for an endless blade band saw and which is automatically operable upon breaking of the saw blade to prevent the severed blade from flying out of the saw housing and thereby possibly injuring a bystander or operator.

Another object of this invention is to provide a safety device having a belt tension arm which is sensitive to the breaking of the belt to close an electric switch for activating a ram, embodying the features of this invention, to hold clampingly the blade from further movement.

Still another object of this invention is to provide a blade trap tripping mechanism operable upon energization of the circuit through electromagnetic means.

In accordance with the general features of this invention, there is provided a safety mechanism for a band saw of the type including an endless blade moving through a guard-like housing, electric circuit means automatically actuable upon breaking of the blade, blade clamping means for engaging a flat side of the blade inside of the housing to engage clampingly the broken blade, force transmitting means for projecting the clamping means against the blade in the housing, and an electric element energized upon actuation of the circuit means to release the force of the transmitting means for impelling the clamping means against the broken blade.

Still another feature of the invention relates to the provision of a safety mechanism for use with a band saw machine including a tubular housing through which the band saw moves and which housing has an aperture facing the side of the blade comprising a plunger positioned to move into the housing aperture at substantially right angles to the path of travel of the blade for forcibly clamping the blade against the housing to arrest movement of the blade, and electromagnetic means energized by the breaking of the saw blade to actuate said plunger.

In accordance with still other features of the invention, there is provided electromagnetic means including a trigger movable into the path of a compression plunger for holding the plunger in retarded position, and releasable upon energization of the electromagnetic means to release the compression plunger.

It should be noted that the terms "blade" and "belt" are used interchangeably as substantial equivalents.

Other objects and features of this invention will more fully appear from the following detailed description, taken in connection wth the accompanying drawings which illustrate an embodiment thereof, and in which:

Figure 1 is a more or less diagrammatic side view of a conventional band saw employing my novel band saw blade trap which embodies the features of this invention;

Figure 2 is an enlarged fragmentary cross sectional view taken on the line II—II of Figure 1 as indicated by the arrows and showing in full and dotted lines the relative positions of the ram;

Figure 3 is an enlarged side view similar to a portion of Figure 1, showing in greater detail my novel blade trap;

Figure 4 is a sectional view taken on line IV—IV of Figure 3 looking in the direction indicated by the arrows; and Figure 5 shows a wiring diagram for the illustrated band saw of Figure 1, whereby two blade traps are contemporaneously activated upon energization of the circuit.

As shown on the drawings:

While I have illustrated my novel blade trap for use in conjunction with a conventional band saw, it will be appreciated that this invention will lend itself to ready use with any number of different types of machines employing an endless belt or continuous blade. It has been found that my invention is most advantageously used in high-speed operations where there is likelihood, due to the breaking of the belt or blade, of the operator or some other person being injured by the uncontrollable flying segments of the belt.

In Figure 1 it will be seen that I have indicated generally the novel blade trap of my invention by the numeral 10, and similarly I have indicated the band saw or machine by the numeral 11.

The band saw 11 has a lower base portion 12 with a pulley 13 mounted thereon in a conventional manner. Connected to the base portion 12 is a supporting arm 14 which projects above the base portion 12. This supporting arm 14 serves to provide a mounting for a power driven pulley 15 which is driven by means of a prime mover (not shown), in a manner well known in the art.

As will be seen from Figure 1, the pulleys 13 and 15 each has substantially its entire perimeter encased in a housing indicated by the numerals 16—16', respectively. Further, attached to the upper housing 16' and the lower housing 16 and supported by the arm 14 is a vertical intermediate saw guard 17. The lower base portion 12 has a working area or table 18 mounted thereon. Located above the table 18 is an adjustable saw blade guideway or post 19 suspended from above and connected to the upper housing 16'. This guideway 19, as is customary, is made up of fixed and movable members as shall be referred to hereinafter.

Mounted on the pulleys 13 and 15 is an endless or continuous belt, or band saw blade 20. This blade 20 passes through the saw guard 17 on its rear side looking from the front of the band saw and through the adjustable guideway 19 in the frontal area above the table 18. The blade 20 is also encased at it upper and lower extremities by the housing 16 and 16'. Thus, the only area where the blade 20 is not confined is immediately above the table 18 where the sawing and cutting operations are performed.

Hence, it is seen that the band saw 11 is of a generally conventional construction. Further, with the blade so encased, the only area where the blade ends would be free to escape, in case of fracturing, is adjacent and above the working table.

Turning now to my novel blade trap 10 which is the subject of my invention, it will be appreciated that such a device readily lends itself to use in connection with highspeed saws where, if the blade should break, there is a likelihood that the loose ends of the blade may not only cause considerable damage to the machine but injury to nearby workers.

As best shown in Figures 3 and 4, it will be noted that the assembled blade trap 10 is bolted at 21 to the adjustable guideway 19. More specifically it will be seen that the blade trap 10 is bolted to a non-sliding member 22 of the adjustable guideway 19, which permits sliding member 23 of the guideway to be adjustably telescoped in the non-sliding member 22.

The blade trap 10 comprises a ram or plunger 24 slidably mounted within a ram housing 25. The ram housing 25 consists of two plates 26 and 26' separated at their opposite ends by blocks 27 and 27', with bolts 28—28 holding the ram housing 25 together at its opposite ends.

Within the ram housing 25 is mounted the slidable ram 24. The ram 24 has a ramming end 29 connected to an intermediate transverse shouldered bar 30. Extending in the same general plane but away from the ram end 29 are two rods 31—31, and which extend through guide apertures 32—32 in the block 27' and are joined together outside of the ram housing 25 by means of an end plate 33 intersecting the end portions of the rods 31—31 and bolted thereto (Figure 2).

Mounted on the respective rods 31—31 between the bar 30 and the block 27' are compression springs 34—34 which provide the necessary force, when released, for the ram to clampingly arrest movement of the blade.

It will now be perceived that the ram 24 when in clamping position is capable of extending substantially the full length of the ram housing 25. In the blade-clamping position the ram end 29 will telescope within a ram end receiving and guiding cavity 35 formed in end block 27 as well as extend through a guiding channel in intermediate block 36 secured to plates 26—26'. In the open or cocked position the ram end 29 will be supported by block 36 but will be disengaged from end block 27.

Referring again to Figures 3 and 4, but turning now to a solenoid 37, it will be seen that it is bolted above the ram 24 and ram housing 25 at 38—38 to an upper plate 39 which in turn is supported by vertical plate 40 carried by bottom plate 41 which extends under and is attached to the ram housing 25. The three plates 39, 40 and 41 together form a U-shaped channel.

Extending outwardly from the plate 40 and perpendicular to the plates 39 and 41 is an integral connecting flange 42 which secures the blade trap 10 to the adjustable guideway 19.

The solenoid 37 is of a conventional type having a wire coil 43 and a core 44 with a vertical trigger arm 45 mounted and pivoted thereto at 46. As best seen in Figures 3 and 4, the upper plate 26' of the housing 25 has an aperture 47 therethrough which receives the trigger arm 45. This arm, upon cocking of the ram 24, will hold the ram in retracted position until the solenoid 37 is energized, when the core 44 and the trigger arm 25 will be drawn upward toward the coil 43, releasing the ram 24.

The pivot 46 on the trigger arm 45 serves to help align the arm 45 with the aperture 47 if there is misalignment.

Turning to Figure 2, it will be seen that the ram 24 may be cocked by progressively threading a screw 48 through the plate 33 and against block 27', gradually drawing the ram end 29 back into the ram housing 25 until the trigger arm 45 moves downward into aperture 47 to an extent sufficient to move into the path of block 30. Thereafter, the cocking screw 48 can be disengaged and removed from plate 33.

Referring to Figure 1, it will be seen that there is mounted under the supporting arm 14 a hand wheel 50. This hand wheel 50 is in turn connected to a spring-tension lever 51, and by means of an indicator (not shown) permits the proper saw tension to be set between the pulley 15 and the blade 20 in a manner well known in the art.

The end of the spring tension lever 51 is mounted adjacent an electric micro-switch 52 also located on the supporting arm 14. Upon breaking of the saw blade 20 the spring tension lever 51 is urged against the micro-switch 52, closing a circuit 53 (Figure 5) for energizing the solenoid 37 to release ram 24.

In other words, the electric circuit means, upon closing of the circuit 53, acts through the solenoid 37 to release the spring force of blade clamping means or ram 24 to clampingly trap the broken blade 20 in the ram end receiving cavity 35.

It will be understood that since there is a slight gap between the lower pulley 13 and the saw guard 17, that it might be expedient, as shown in Figure 1, to mount another blade trap 10 adjacent this gap to preclude the broken blade 20 from escaping therethrough. In that event, two solenoid coils 43 would be included in circuit 53 as shown in Figure 5.

Figure 5 illustrates diagrammatically the electric circuit employed. In the diagram the switch 52 is shown in an open position, with the blade trap coils 43 in parallel. It is understood, therefore, that upon breaking of the blade 20, both blade traps 10 can operate contemporaneously to trap the broken blade sections.

While I have illustrated my novel blade trap to be especially adaptable for use with a band saw, it will be readily seen and understood that such a device might similarly be employed in any number of different types of machines having similar problems and may have various other uses and applications. That is to say, it need not necessarily be employed with a saw but might, for example, be used with a chain belt, or leather belting employed in highspeed drives.

From the foregoing, it is now apparent that the belt is normally held under tension by the upper pulley 15. When the blade breaks, this tension is released whereupon the micro-switch 52 is closed.

The closing of the micro-switch 52 energizes the electric circuit 53 thereby causing the solenoid 37 to withdraw the trigger arm 45 from engagement with the ram 24. When the trigger arm 45 is out of restraining engagement with the ram 24, the ram is permitted, through compression springs, to be projected against the broken blade to clampingly restrain further movement. As the broken blade is arrested by the ram 24, the blade is pinioned within a cavity formed in the end block 27.

It will be understood that modifications and variations may be effected without departing from the scope of the novel concepts of the present invention.

I claim as my invention:

1. A safety mechanism for a band saw of the type including an endless blade moving through a guard-like housing, comprising electric circuit means automatically energized upon breaking of the blade, blade clamping means movable into said housing to clamp the broken blade thereagainst, force transmitting means for projecting said clamping means against the blade in the housing, means normally restraining said clamping means and an electric element actuated upon energization of said circuit means to cause said restraining means to release the force of said transmitting means to project said clamping means against the broken blade.

2. For use with a band saw machine including a tubular housing through which the band saw moves and which housing has an aperture facing a side of the blade, safety mechanism comprising a plunger positioned to move into the housing aperture at substantially right angles to the path of travel of the blade for forcibly clamping the blade against the housing to arrest movement of the blade, and electromagnetic means energized by the breaking of the saw blade to actuate said plunger, said electromagnetic means including a trigger movable into the path of the plunger for holding it in retarded position and releasable upon energization of the electromagnetic means to release the plunger.

3. For use with a band saw machine including a tubular housing through which the band saw moves and which housing has an aperture facing a side of the blade, safety mechanism comprising a plunger positioned to move into the housing aperture at substantially right angles to the path of travel of the blade for forcibly clamping the blade against the housing to arrest movement of the blade, electromagnetic means energized by the breaking of the saw blade to release said plunger, said plunger including a slidable ram, and spring-urged means normally held in compressed state for actuating the ram upon energization of said electromagnetic means and release of said plunger.

4. A safety mechanism for a band saw of the type including an endless blade moving through a guard-like housing, electric circuit means automatically actuatable upon breaking of the blade, blade clamping means for engaging the blade inside of the housing to engage clampingly the broken blade, force transmitting means for projecting said clamping means against the blade in the housing, and an electric element energized upon actuation of said circuit means to release the force of said transmitting means for impelling said clamping means against the broken blade, said blade clamping means comprising a ram mounted within a channelled ram housing and movable transversely into and out of engagement with said blade, said ram having a ram end conforming generally to the shape of the channel and a rearwardly extending rod with spring means confined within the channel and exerting ram pressure against said ram end, said rod being guidingly carried by said housing upon loading and releasing of said spring and ram.

5. A safety mechanism for a band saw of the type including an endless blade moving through a guard-like housing, electric circuit means automatically actuatable upon breaking of the blade, blade clamping means for engaging the blade inside of the housing to engage clampingly the broken blade, force transmitting means for projecting said clamping means against the blade in the housing, and an electric element energized upon actuation of said circuit means to release the force of said transmitting means for impelling said clamping means against the broken blade, said electric element comprising a solenoid connected to said circuit means, said solenoid being mounted adjacent said blade clamping means and having a trigger cooperable and movable therewith upon actuation of said solenoid out of the path of said blade clamping means.

6. A safety mechanism for a band saw of the type including an endless blade moving through a guard-like housing, electric circuit means automatically actuatable upon breaking of the blade, blade clamping means for engaging the blade inside of the housing to engage clampingly the broken blade, force transmitting means for projecting said clamping means against the blade in the housing, and an electric element energized upon actuation of said circuit means to release the force of said transmitting means for impelling said clamping means against the broken blade, said electric circuit means comprising an electric switch operable upon loss of tension in the blade to effect actuation of said electric element to release said force transmitting means for propelling said blade clamping means into blade clamping position.

References Cited in the file of this patent
UNITED STATES PATENTS

| | | |
|---|---|---|
| 1,769,656 | Sullenberger | July 1, 1930 |
| 1,927,203 | De Groot | Sept. 19, 1933 |
| 1,994,059 | Wobensmith | Mar. 12, 1935 |
| 2,045,022 | Nepo | June 23, 1936 |
| 2,124,917 | Halliburton et al. | July 26, 1938 |
| 2,213,466 | Glynn | Sept. 3, 1940 |
| 2,286,589 | Tannewitz | June 16, 1942 |
| 2,311,268 | Tannewitz | Feb. 16, 1943 |